US006299231B1

(12) United States Patent
Reitz

(10) Patent No.: US 6,299,231 B1
(45) Date of Patent: Oct. 9, 2001

(54) VEILING GLARE REDUCTION SYSTEM

(75) Inventor: Kay Margaret Reitz, Dearborn, MI (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/681,576

(22) Filed: May 2, 2001

(51) Int. Cl.[7] .......................................... B60J 3/00
(52) U.S. Cl. ........................ 296/97.7; 296/96.19
(58) Field of Search .................... 296/96.19, 97.7, 296/70

(56) References Cited

U.S. PATENT DOCUMENTS

| | | |
|---|---|---|
| H139 * | 10/1986 | Task . |
| 5,316,359 * | 5/1994 | Lansinger . |
| 5,335,099 | 8/1994 | Smith . |
| 5,926,310 | 7/1999 | Tamura et al. . |
| 5,999,314 | 12/1999 | Sakura et al. . |
| 6,056,397 | 5/2000 | Berlad . |
| 6,089,643 * | 7/2000 | Wang et al. . |

* cited by examiner

Primary Examiner—Joseph D. Pape
Assistant Examiner—Scott Carpenter
(74) Attorney, Agent, or Firm—Raymond L. Coppiellie

(57) ABSTRACT

A vehicle veiling glare reduction system includes a windshield having an inner and outer surface, a first polarization layer disposed on at least one windshield surface adapted to polarize light in a first predetermined direction, a dashboard having an upper surface, and a second polarization layer disposed on the dashboard upper surface adapted to polarize light in a second predetermined direction other than the windshield inner surface.

18 Claims, 2 Drawing Sheets

VEILING GLARE REDUCTION SYSTEM

BACKGROUND OF INVENTION

The present invention relates to vehicle glare reduction systems, and more specifically, to a veiling glare reduction system.

The problem of veiling glare is nothing new to vehicle designers. Veiling glare occurs when light passes through the windshield, reflects off of the dashboard back onto the windshield, and reflects off the windshield and into the driver's eyes. The driver sees a virtual image of the lit dashboard beyond his windshield that "veils" or impedes his ability to see the road ahead. Increased window slope or "cab forward" designs, while aesthetically pleasing and aerodynamically preferred, increase the likelihood of veiling glare. The use of light colored, glossy finish dashboards also increases veiling glare.

In order to compensate for veiling glare, designers have been forced to limit the degree of windshield slope as well as to use dark colors and a corrugated, non-glossy texture on the dashboard surface. A holographic windshield system has been envisioned to combat the veiling glare problem, which however, is complicated and expensive to manufacture.

It would therefore be beneficial to provide vehicle designers with the flexibility to use lighter colored, glossier dashboards and cab forward windshield designs by eliminating the veiling glare problem with a simple and inexpensive system.

SUMMARY OF INVENTION

It is an object of the present invention to provide a veiling glare reduction system that overcomes the disadvantages of the prior art.

It is a feature of the present invention to use a combination of light polarization filters to accomplish the function of eliminating veiling glare.

The present invention advantageously provides a vehicle veiling glare reduction system including a windshield having an inner and outer surface, a first polarization layer disposed on at least one windshield surface adapted to polarize light in a first predetermined direction, a dashboard having an upper surface, and a second polarization layer disposed on the dashboard upper surface adapted to polarize light in a second predetermined direction other than the windshield inner surface.

BRIEF DESCRIPTION OF DRAWINGS

These and other objects, features, and advantages of the present invention will become apparent from a reading of the following detailed description with reference to the accompanying drawings, in which.

DETAILED DESCRIPTION

Figure 1:
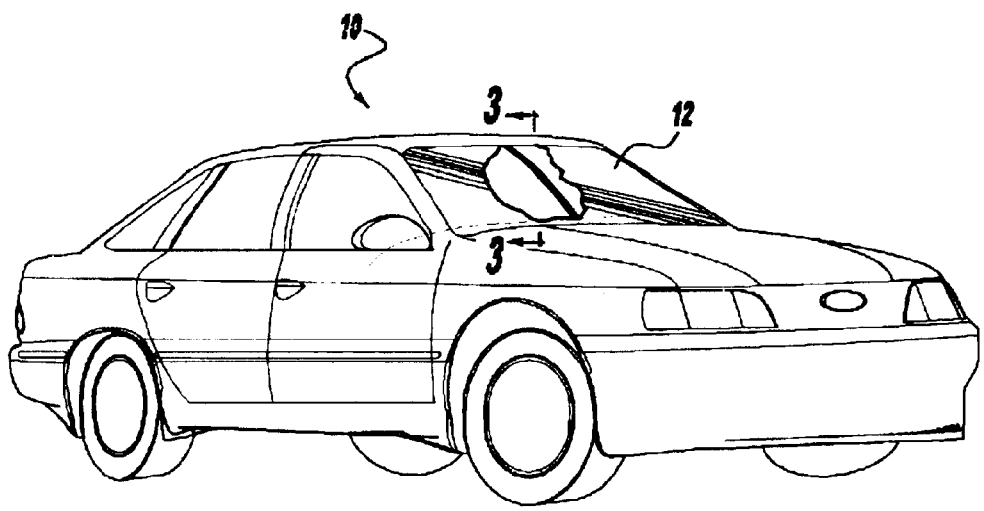
FIG. 1 is a perspective view of a vehicle having a veiling glare reduction system according to the present invention.
Figure 2:
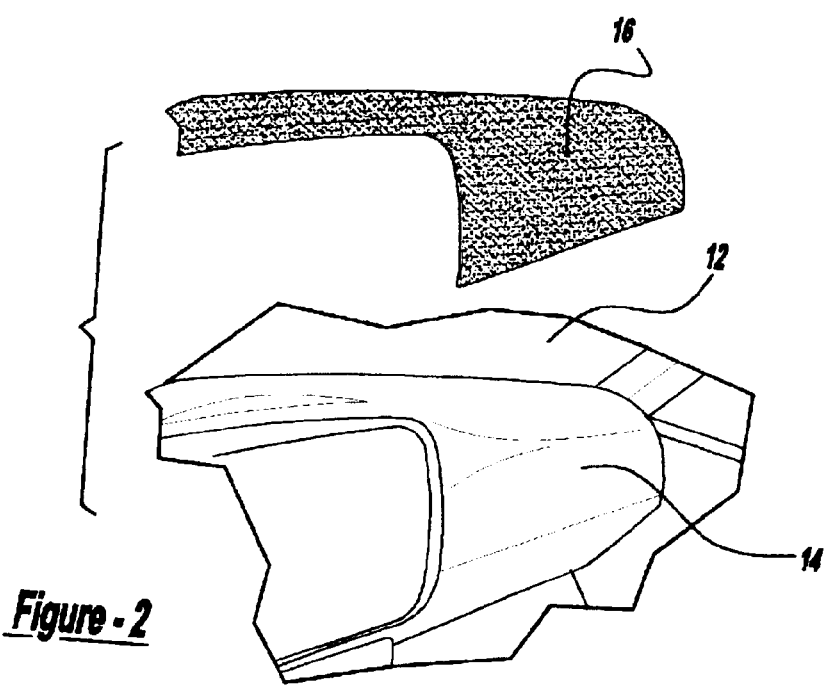
FIG. 2 is an exploded perspective cut-away view of a polarized vehicle dashboard according to the present invention.

In FIGS. 1 and 2, a vehicle 10 having a windshield 12 and a dashboard 14 is shown. As shown in FIG. 2, the dashboard 14 has a polarization layer 16, which functions to polarize light in a predetermined direction as is known in the art.

Figure 3:
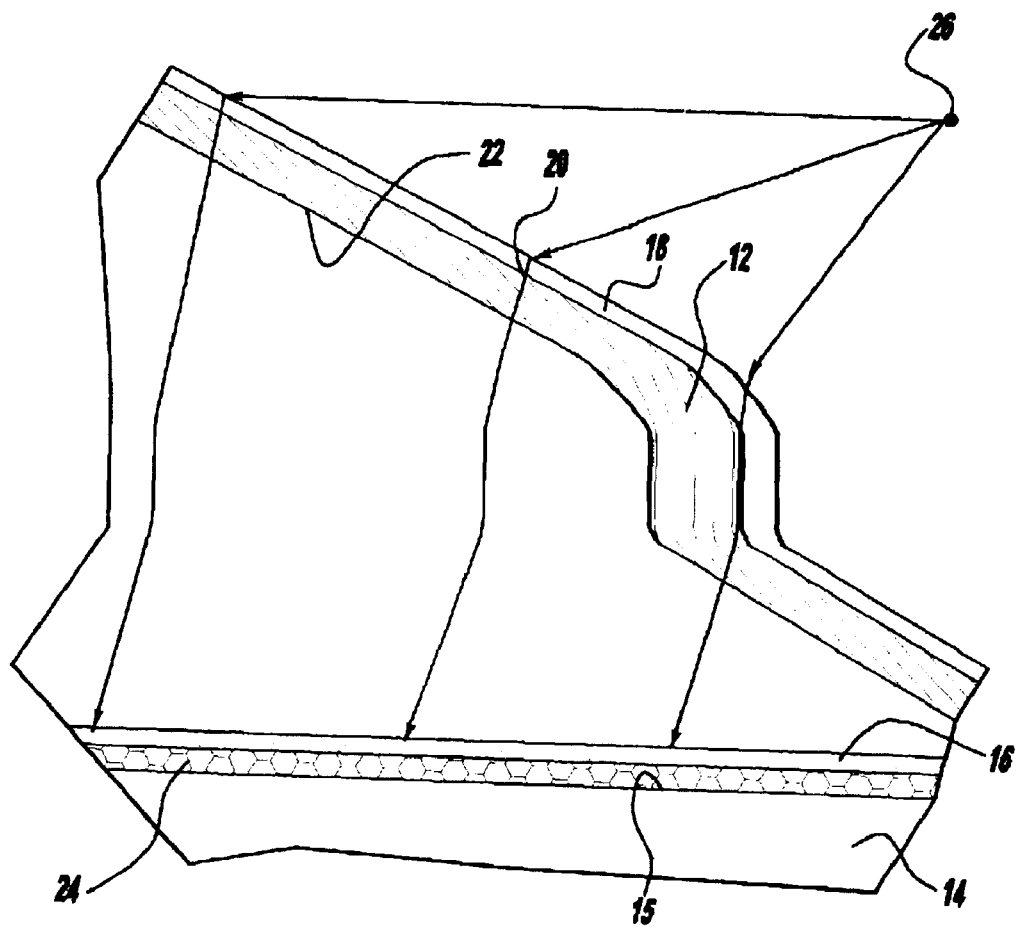
FIG. 3 is a cross-sectional view taken along the line 3—3 of FIG. 1 of a polarized windshield and dashboard according to the present invention.

As shown in FIG. 3, the windshield 12 has a polarization layer 18 covering preferably the entire outer windshield surface 20. The polarization layer 18 may cover the inner windshield surface 22 or may be incorporated into the glass of the windshield 12 itself, to perform the polarization function, without departing from the scope of the present invention. A light absorber 24 is sandwiched between the dashboard 14 and the dashboard polarization layer 16.

In use, diffuse light 26 is received by the windshield polarization layer 18 and polarized in a first predetermined direction, through the windshield 12, and toward the dashboard 14. When the light reaches the dashboard 14, the dashboard polarization layer 16 polarizes the light in a second predetermined direction, preferably parallel to the dashboard surface 15 or into the absorption layer 24, and is absorbed by the absorption layer 24. The absorption layer 24, by absorbing the incoming light, serves to prolong the life of the dashboard 14.

The combination of the windshield polarization layer 18, the dashboard polarization layer 16, and the absorption layer 24 function to prevent light from reflecting off of the dashboard surface 14, onto the windshield inner surface 22, and into the eyes of the vehicle occupant as veiling glare. This advantageously provides vehicle designers with the flexibility to use lighter colored, glossier dashboards and cab forward windshield designs by eliminating the veiling glare problem with a simple and inexpensive system. This veiling glare reduction system will not interfere with non-polarized light such as driving/parking lights, signal lights, street lighting, and other ambient light. The combination of polarization layers may also be used to reduce glare from rear entertainment video screens, sun visors, rear and side view mirrors, fog lamps, day time running lamps and a variety of other subsystem applications.

While only one embodiment of the vehicle veiling glare reduction system of the present invention has been described, others may be possible without departing from the scope of the following claims.

What is claimed is:

1. A vehicle veiling glare reduction system comprising:
   a windshield having an inner and outer surface;
   a first polarization layer, disposed on at least one windshield surface, adapted to polarize light in a first predetermined direction;
   a dashboard having an upper surface; and
   a second polarization layer, disposed on the dashboard upper surface, adapted to polarize light in a second predetermined direction other than the windshield inner surface.

2. The veiling glare reduction system as defined in claim 1, wherein the first polarization layer is disposed on the windshield outer surface.

3. The veiling glare reduction system as defined in claim 1, wherein the first predetermined direction is toward the dashboard.

4. The veiling glare reduction system as defined in claim 1, wherein the second predetermined direction is along the dashboard upper surface.

5. The veiling glare reduction system as defined in claim 1, further including an absorption layer disposed on the dashboard upper surface.

6. The veiling glare reduction system as defined in claim 5, wherein the absorption layer is sandwiched between the second polarization layer and the dashboard upper surface.

7. The veiling glare reduction system as defined in claim 6, wherein the second predetermined direction is toward the absorption layer.

8. A vehicle veiling glare reduction system comprising:

a windshield having an inner and outer surface;

a first polarization layer, disposed on at least one windshield surface, adapted to polarize light in a first predetermined direction;

a dashboard having an upper surface;

a second polarization layer, disposed on the dashboard upper surface, adapted to polarize light in a second predetermined direction other than the windshield inner surface; and an absorption layer disposed on the dashboard upper surface.

9. The veiling glare reduction system as defined in claim 8, wherein the first polarization layer is disposed on the windshield outer surface.

10. The veiling glare reduction system as defined in claim 8, wherein the first predetermined direction is toward the dashboard.

11. The veiling glare reduction system as defined in claim 8, wherein the second predetermined direction is along the dashboard upper surface.

12. The veiling glare reduction system as defined in claim 8, wherein the absorption layer is sandwiched between the second polarization layer and the dashboard upper surface.

13. The veiling glare reduction system as defined in claim 12, wherein the second predetermined direction is toward the absorption layer.

14. A vehicle veiling glare reduction system comprising:

a windshield having an inner and outer surface;

a first polarization layer, disposed on at least one windshield surface, adapted to polarize light in a first predetermined direction;

a dashboard having an upper surface;

a second polarization layer, disposed on the dashboard upper surface, adapted to polarize light in a second predetermined direction other than the windshield inner surface; and an absorption layer sandwiched between the second polarization layer and the dashboard upper surface.

15. The veiling glare reduction system as defined in claim 14, wherein the first polarization layer is disposed on the windshield outer surface.

16. The veiling glare reduction system as defined in claim 14, wherein the first predetermined direction is toward the dashboard.

17. The veiling glare reduction system as defined in claim 14, wherein the second predetermined direction is along the dashboard upper surface.

18. The veiling glare reduction system as defined in claim 14, wherein the second predetermined direction is toward the absorption layer.

* * * * *